No. 812,708. PATENTED FEB. 13, 1906.
C. C. WEBSTER.
MACHINE FOR MANUFACTURING PRINTERS' LEADS.
APPLICATION FILED OCT. 22, 1904.
7 SHEETS—SHEET 1.
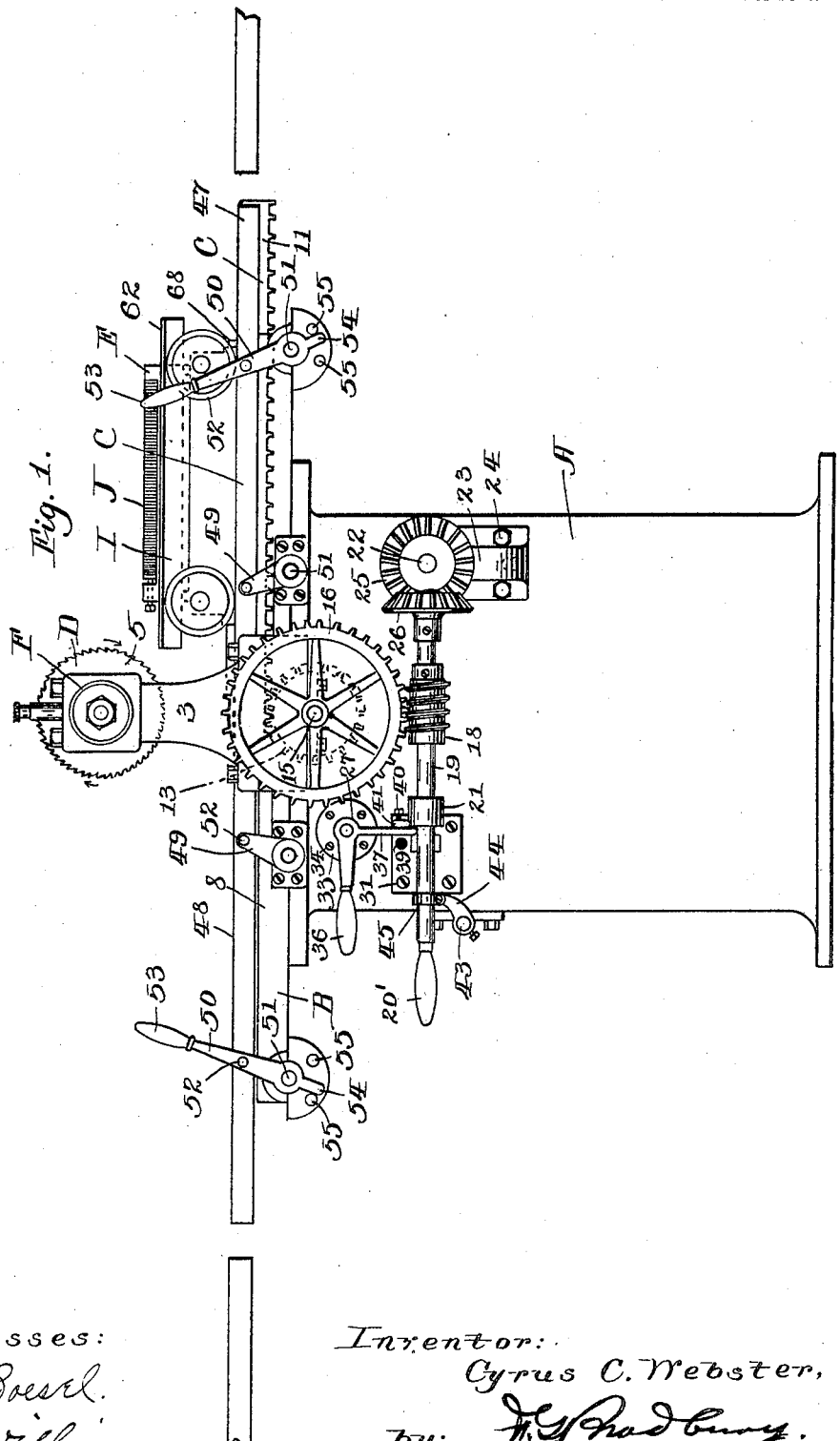
Witnesses:
E. M. Boesel.
U. H. Williams
Inventor:
Cyrus C. Webster,
by: W. S. Bradbury.
Attorney.

No. 812,708. PATENTED FEB. 13, 1906.
C. C. WEBSTER.
MACHINE FOR MANUFACTURING PRINTERS' LEADS.
APPLICATION FILED OCT. 22, 1904.
7 SHEETS—SHEET 2.
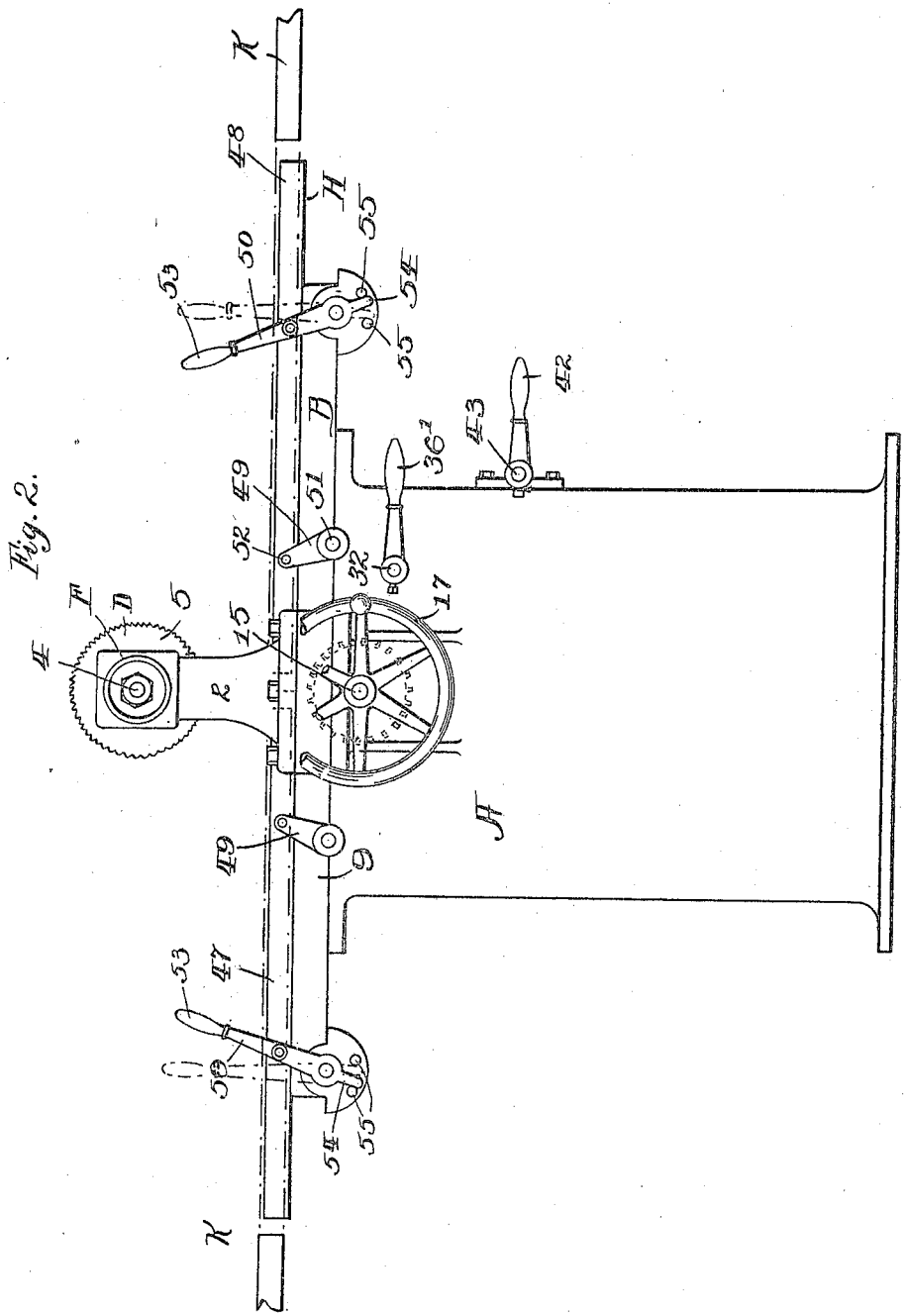
Witnesses:
E. M. Boesel.
W. H. Williams
Inventor:
Cyrus C. Webster,
by: W. S. Bradbury.
Attorney.

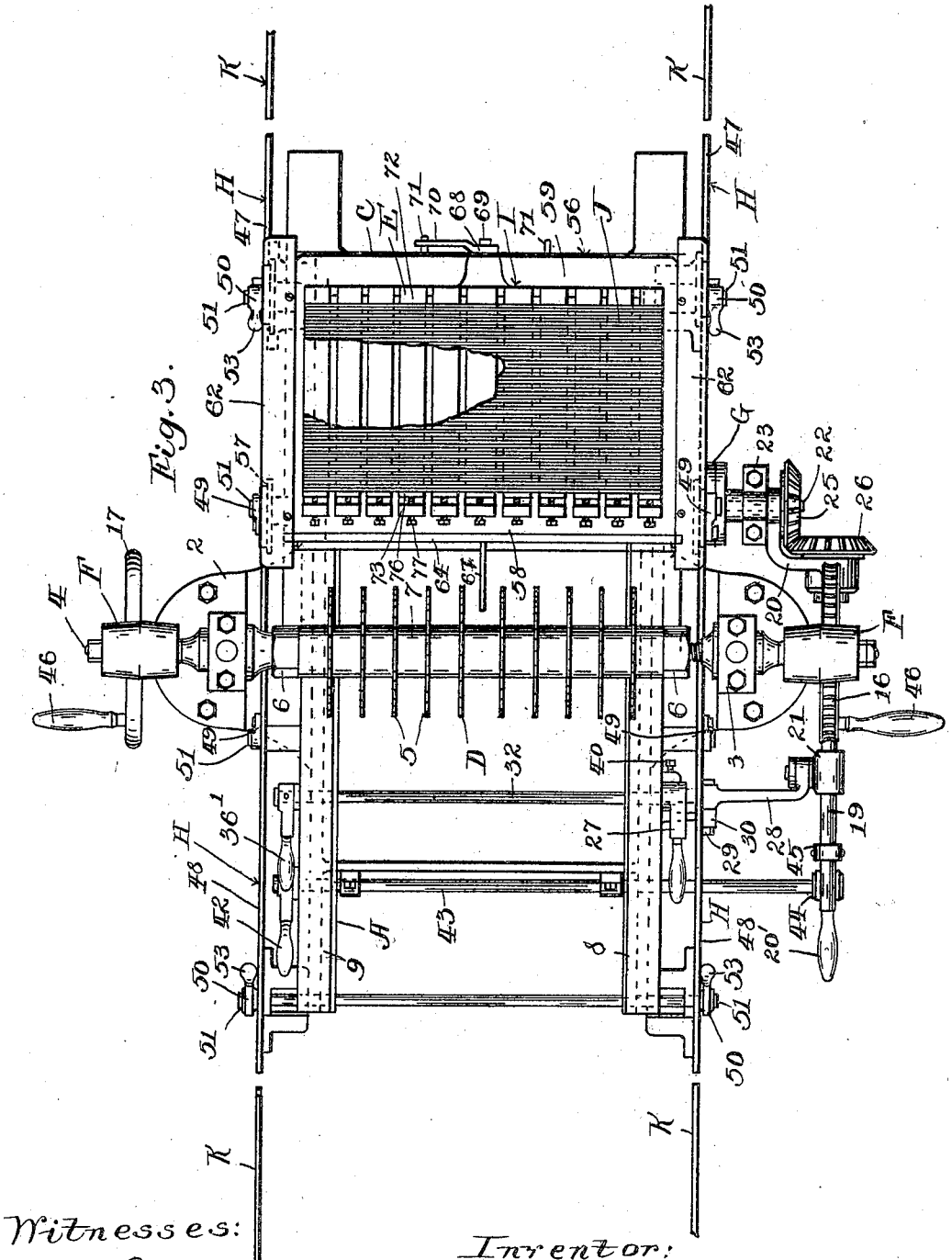

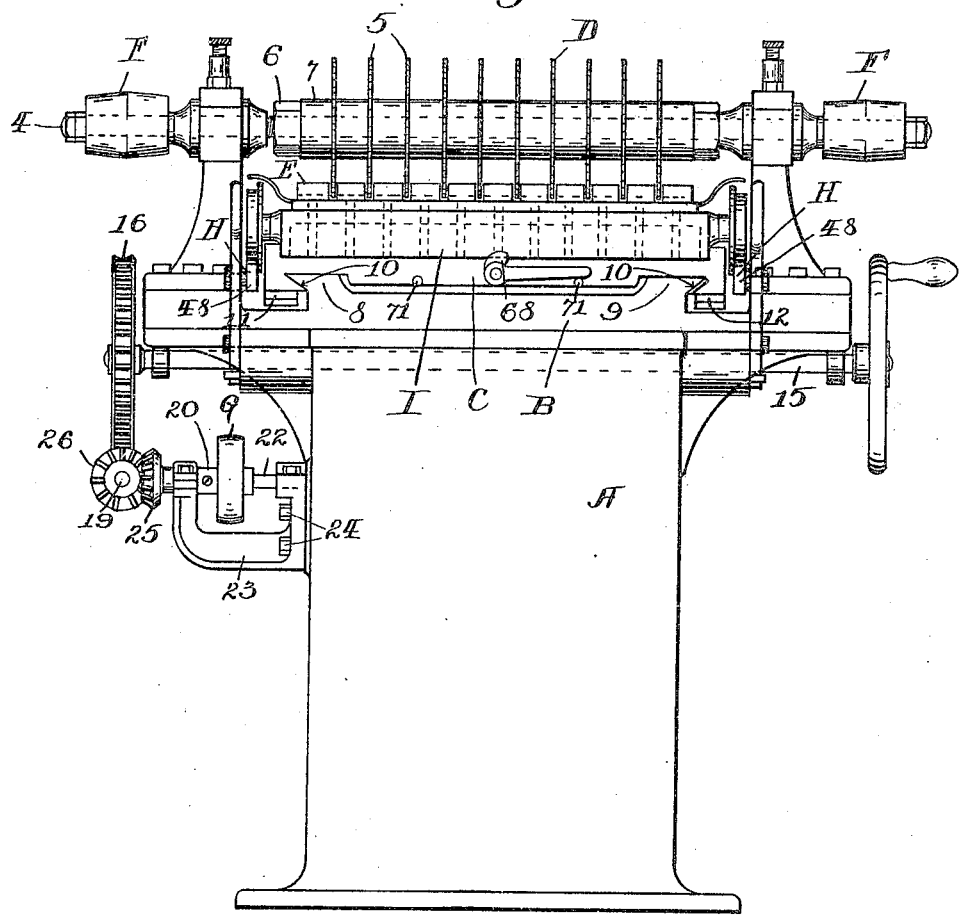

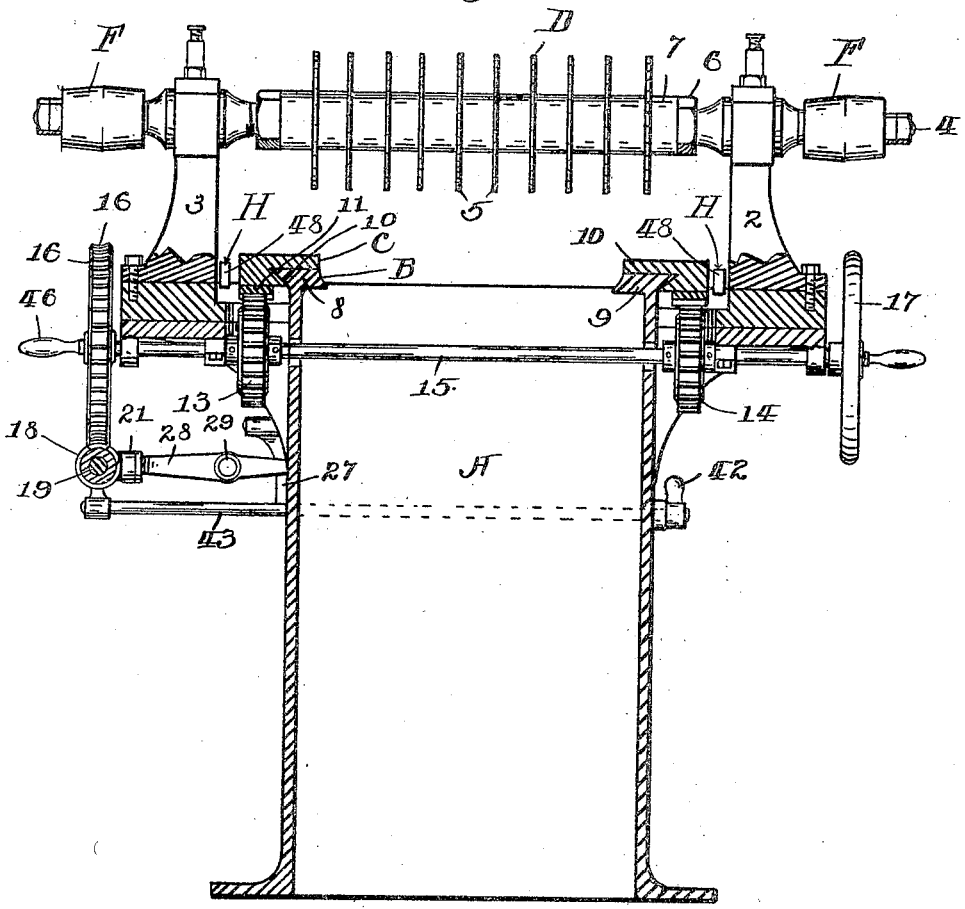

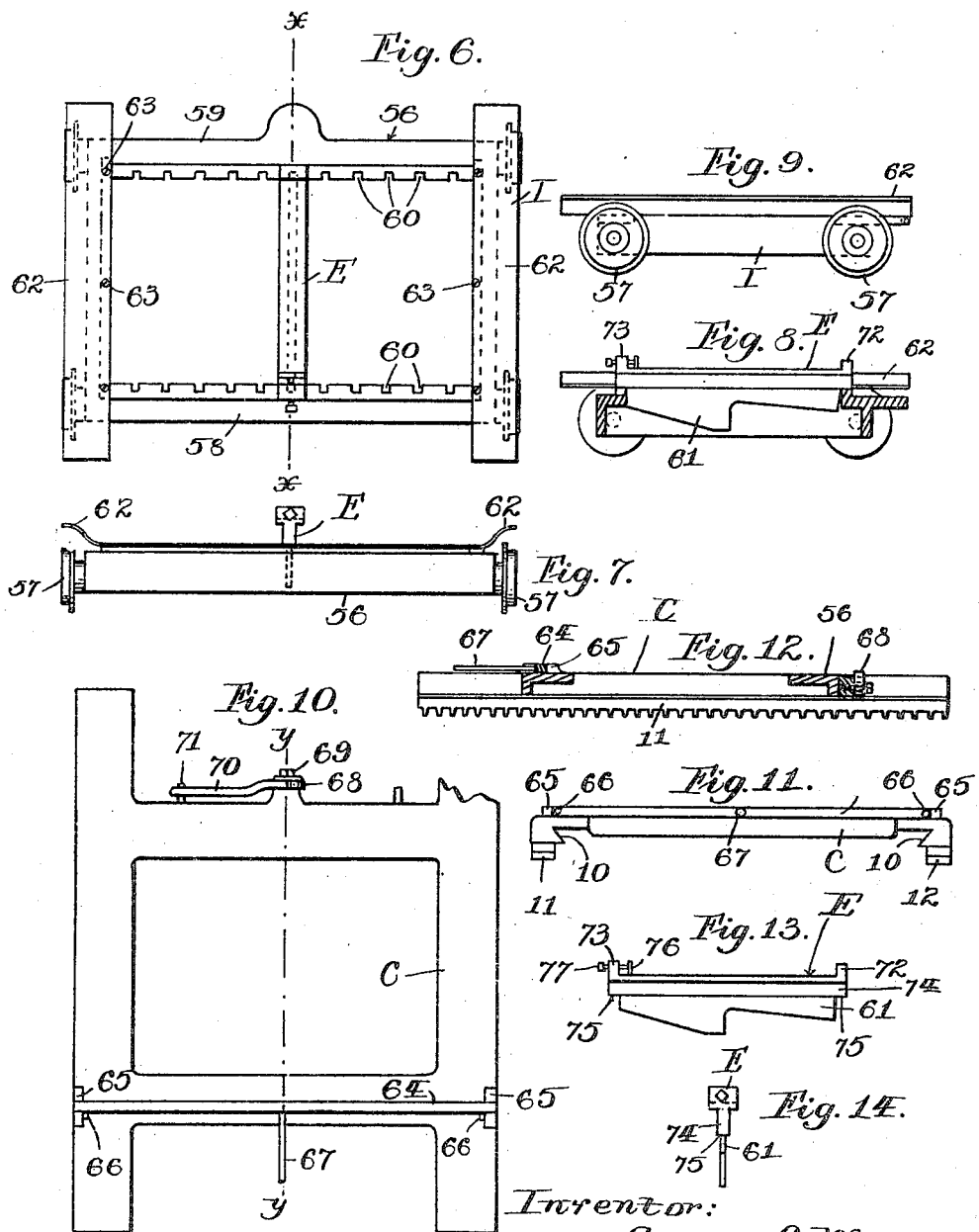

No. 812,708. PATENTED FEB. 13, 1906.
C. C. WEBSTER.
MACHINE FOR MANUFACTURING PRINTERS' LEADS.
APPLICATION FILED OCT. 22, 1904.
7 SHEETS—SHEET 7.
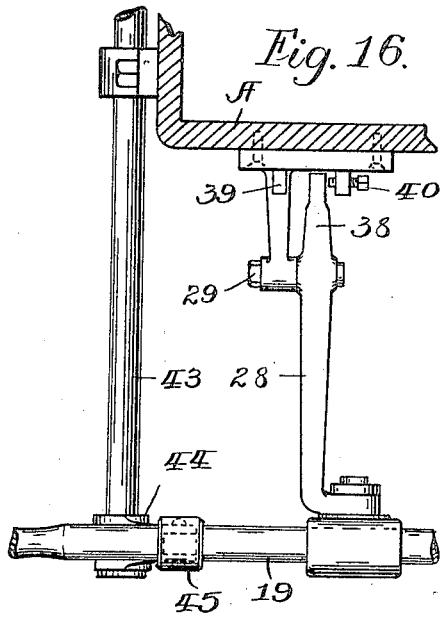
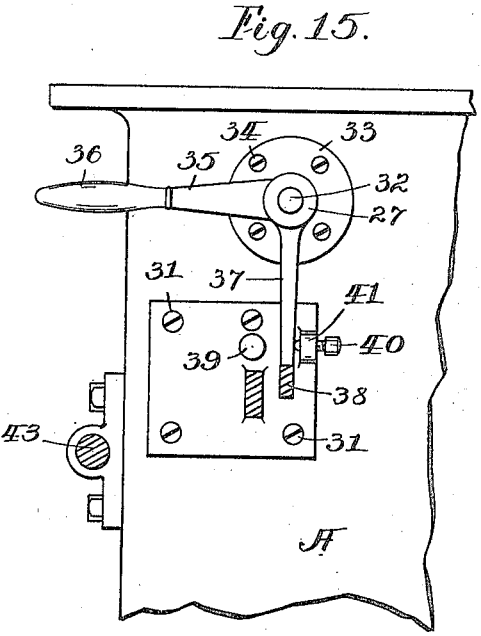
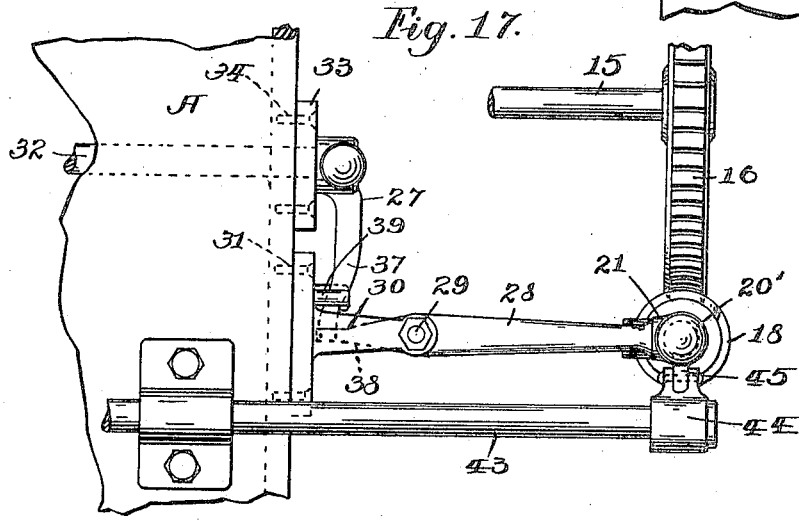
Witnesses:
E. M. Boesel.
W. H. Williams.
Inventor:
Cyrus C. Webster,
by: H. C. Bradbury.
Attorney.

UNITED STATES PATENT OFFICE.

CYRUS C. WEBSTER, OF MINNEAPOLIS, MINNESOTA.

MACHINE FOR MANUFACTURING PRINTERS' LEADS.

No. 812,708.      Specification of Letters Patent.      Patented Feb. 13, 1906.

Application filed October 22, 1904. Serial No. 229,588.

*To all whom it may concern:*

Be it known that I, CYRUS C. WEBSTER, a citizen of the United States, residing at Minneapolis, in the county of Hennepin and State of Minnesota, have invented a new and useful Machine for Manufacturing Printers' Leads, of which the following is a specification.

My invention relates to improvements in machines for manufacturing printers' leads, the object being to provide means for cutting a plurality of strips of metal into short pieces of equal lengths during one operation with greater speed than has heretofore been possible and a minimum amount of labor and expense and holding the pieces after the strips are cut. To these ends a gang of cutters is provided and the strips of metal are held by a series of detachable clamps. The cutters pass between the clamps and cut the strips into equal lengths. The strip so cut being held in stacks by the several clamps may then be passed through a finishing-machine without removing them from the clamps.

By the use of my improved machine printers' leads may be made from strips of metal and when finished packed ready for shipment without sorting.

In the accompanying drawings, forming part of this specification, Figure 1 is a side view of my improved machine, showing the truck locked in the carriage ready to pass the cutters. Fig. 2 is a view looking at the other side of the machine. Fig. 3 is a plan view. Fig. 4 is an end view. Fig. 5 is a cross-sectional view in elevation. Fig. 6 is a plan view of the truck, showing one of the detachable clamps in place. Fig. 7 is an end view of Fig. 6. Fig. 8 is a sectional view on the line X X of Fig. 6. Fig. 9 is a side view of the truck, showing the detachable clamps removed. Fig. 10 is a plan view of the carriage, partly broken away. Fig. 11 is an end view of the carriage. Fig. 12 is a sectional view of Fig. 10, taken on the line Y Y. Fig. 13 is a side view of one of the detachable clamps. Fig. 14 is an end view of Fig. 13; and Figs. 15, 16, and 17 are detail views, partly in section, of part of the operating mechanism.

In the drawings let A represent the frame of the machine; B, the bed; C, the carriage; D, the gang of cutters; E, one of the clamps of the carriage; F, the drive-pulleys for rotating the cutters, and G the drive-pulley for operating the feed mechanism.

The frame A is of suitable construction and supports the bed B and journal-posts 2 and 3. A transverse shaft 4 is journaled in said posts and carries the cutters 5, (in the form of rotary saw-blades,) which are equally spaced apart and held firmly in position by means of the nuts and washers 6 and 7. The pulleys F on the ends of the shaft are adapted to revolve the cutters in the direction of the arrows shown in Fig. 1. The bed B has a pair of longitudinal and parallel guides 8 and 9 below said cutters. The carriage C slides on said guides below said cutters and is held on said guides by means of the bevel-shoulders 10. The carriage is rectangular and formed with a pair of parallel racks 11 and 12, depending from its lower surface adjacent to its sides. Pinions 13 and 14, respectively, mesh with said racks and are mounted upon the shaft 15, which is journaled upon the frame and carries on one end a worm-gear 16 and upon its other end a hand-wheel 17. A worm-pinion 18 normally meshes with said worm-gear and is mounted upon the longitudinal shaft 19, which has one of its ends journaled in the yoke 20 and its other end journaled in the collar 21. A transverse drive-shaft 22 is journaled on the bracket 23, which is fastened to the frame by means of the bolts 24. This transverse shaft carries the drive-pulley G and is operatively connected with the longitudinal shaft 19 by means of the intermeshing bevel-gears 25 and 26. The yoke 20 is freely journaled on the drive-shaft 22, so that the shaft 19 may be swung up and down to cause the worm-pinion 18 to engage or disengage the worm-gear 16, and thus throw the carriage C into and out of operation. The worm-pinion is held in operative connection with the worm-gear by means of the lock 27. (See Figs. 15, 16, and 17.) A lever 28 is pivotally connected on one end to the collar 21 and between its ends is pivoted, by means of the bolt 29, upon the bracket 30, which is fastened upon the side of the frame by means of the screws 31. The lock 27 is in the form of a bell-crank lever, which is mounted upon the shaft 32 and journaled on the frame and bracket 33, which in turn is fastened on the frame by means of the screws 34. The horizontal shaft 32 carries handles 36 and 36', which form a weight, the tendency of which is to swing a depending arm 37 of said lock into the path of the vertical movement of the free end 38 of the lever 28. A stop 39 limits the swinging movement of the lock in one direction, and the adjusting-bolt 40, passing through the lip 41, limits it in the other direction. By lifting the handle 36 or 36' the lock is tripped from engagement with the free end of the lever 28 and the worm-pinion disengaged from the worm-gear. By lifting the handle 20', which is formed on the free end of the shaft 19, the worm-pinion is thrown into engagement with the worm-gear, and the lock automatically blocks the movement of the free end of the lever 28 and holds said gear and pinion engaged. By lifting the handle 36 or 36' the free end of the shaft 19 drops and the worm-pinion disengages from the worm-gear. The worm-pinion may also be thrown into engagement with the worm-gear by means of the handle 42 on the opposite side of the machine, which is mounted on the shaft 43. This shaft is journaled on the frame and carries upon its end, below the shaft 19, a connecting-link 44, which is pivoted to the sliding collar 45 on the shaft 19. When the worm-pinion is disengaged from the worm-gear, the carriage may be manually operated by turning the worm-gear or the hand-wheel 17 by means of the handles 46.

The frame supports a sectional track H above its bed and below the cutters. This track has two pairs of horizontal and parallel track-rails 47 and 48, which are adapted to be raised and lowered by means of the swinging arms 49 and 50. These arms are pivoted to the frame by means of the bolts 51 and to the track-rails by pivots 52. The arms 50 carry handles 53 on their upper ends and extensions 54 on their lower ends, said extensions being adapted to impinge against the stop-pins 55 and limit the movement of the track-rails when they are lowered and hold them in superior position when they are raised.

The truck I, which coacts with and forms part of the carriage, is removable from the machine for the purpose of loading and unloading the same with detachable clamps E, to be hereinafter more particularly described, for holding strips of material to be cut into short pieces. This truck has a rectangular frame 56, on the sides of which the flanged wheels 57 are journaled to run without side thrust upon the track H. The cross-bars 58 and 59 of the frame 56 have a series of mortises or notches 60 to receive the tenons 61 on said clamps. Each side of the truck-frame has a guard 62, which is fastened, by means of the screws 63, to prevent any shavings or chips dropping from the cutters upon the tracks or wheels and causing unevenness of operation. The carriage has a detachable stop-bar 64 on one end, which is held in place by the notched lips 65 on the carriage and pins 66 on the bar. This stop-bar has a handle 67, by which it may be lifted out of place. The end of the carriage opposite the end on which the stop-bar is located has a cam 68, which is pivoted, by means of the bolt 69, on the truck-frame and provided with a handle 70. The handle is limited in movement by the pins 71, and when turned the cam is raised or lowered to hold the truck on the carriage and against the stop-bar.

Each detachable clamp E is formed with stop-shoulders 72 and 73 on its ends, a longitudinal rib 74 on its lower side, and a tenon 61, depending from the lower edge of said rib. The clamps are placed in the carriage by inserting their tenons in the mortises 60, which are equally spaced apart, so that the cutters pass freely between them and cut the strips of material into equal pieces. Shoulders 75 are formed on the ends of the rib to rest upon the surface of the truck-frame, and the rib is proportioned to prevent longitudinal movement of the clamps when attached to the truck. Each clamp has a plate 76, which is adjusted by means of a bolt 77.

In operation the clamps are placed in the truck and the strips of material J to be cut into short pieces are fastened in said clamps, as shown in Fig. 1. The movable sections of the track H when in superior position are adapted to register with the sections of the stationary track K, adjoining the ends of the machine. The plates 76 are tightened to hold said strips by turning the bolts 77. The truck when loaded with strips of material, such as lead, is rolled on the rails 47 against the stop-bar 64. The handles 53 are then thrown from the dotted-line position into the full-line position shown in Fig. 2. The track-rails 47 and 48 thus assume a position below the truck-wheels and leave the truck resting entirely upon the carriage. The cam 68 is then turned up, as shown in Fig. 4, and the truck locked on the carriage. The handle 20' is then raised and the worm-pinion engages the worm-gear. The shaft 15 then revolves and the carriage moves forward, the cutters passing between the clamps and cutting the strips of metal into finished lengths. When the carriage reaches the other end of the machine, the lock 27 is moved by the handle 36 to release the lever 28. The shaft 19 falls by its own weight and releases the worm-pinion from the worm-gear. The handles 53 are then turned and the track-rails 47 and 48 raised to the broken-line position shown in Fig. 2. The truck is then moved forward out of the machine on the track-rails in readiness for the clamps holding the pieces of the strips to be passed into a machine (not shown) for finishing the edges cut.

It is obvious that the width or distance between the clamps and the thickness of the cutters and their distance apart may be varied to produce longer or shorter leads. Such adjustment is necessary to vary the product from four-em-pica to five-em-pica leads or to any other size desired, and it is also obvious that equivalent parts may be substituted for the elements described in this invention without departing from the principles which I have applied, and I do not wish to confine myself to the exact construction specified.

Having described my invention, what I claim as new, and desire to protect by Letters Patent, is—

1. A machine of the class set forth, consisting of a suitable bed, a carriage, a series of parallel clamps, equally spaced apart, for holding strips of material across said carriage, a gang of cutters, means for effecting relative sliding motion between said cutters and carriage, for the purpose of causing said cutters to enter between said clamps and cut said strips into pieces, and a tenon-and-mortise connection between each clamp and the carriage, to enable lifting the clamps off of the carriage.

2. A machine for cutting printers' leads, consisting of a series of parallel clamps, spaced apart, for holding strips of material, a carriage below said clamps, a gang of cutters, a suitable bed, means for permitting said carriage to move upon said bed and cause said cutters to enter between said clamps and cut said strips into pieces, and means for attaching said clamps to, and permitting them to be detached from, said carriage, for the purposes specified.

3. A machine for cutting printers' leads, consisting of a carriage, a suitable bed below said carriage, a series of clamps, for holding strips of material, mortised in said carriage and adapted to be removed vertically therefrom, a plurality of cutters by which the strips held by said clamps are cut into equal lengths, and means for permitting said cutters and carriage to pass one another.

4. A machine for cutting printers' leads, consisting of a plurality of parallel clamps, equally spaced apart, a suitable carriage for supporting said clamps, a tenon on each clamp, a mortise in said carriage for receiving each tenon, a supporting-bed, a sliding connection between said bed and carriage, and a gang of cutters adapted to enter between said clamps, for the purposes specified.

5. A machine of the class set forth, consisting of a bed having a pair of parallel guides, a sectional track, means for raising and lowering sections of said track, a gang of cutters, a carriage slidably mounted upon said guides, feed mechanism for said carriage, a truck adapted to run upon said track, means for locking said truck on said carriage when the sections of said track are lowered, and actuating mechanism for driving said parts.

6. A machine for cutting printers' leads, consisting of a bed, a carriage in sliding connection with said bed, a gang of cutters, a truck adapted to move above said bed, and means for locking said truck on said carriage.

7. A machine of the class set forth, consisting of a bed having parallel guides, a track, cutting mechanism, a carriage in sliding connection with said guides, means for moving said carriage on said guides, a truck adapted to run upon said track, means for moving said track to permit said truck to rest upon said carriage, means for locking said truck on said carriage, and actuating mechanism.

8. A machine of the class set forth, consisting of a bed, having parallel guides, a track, means for raising and lowering said track, a carriage on said guides to receive a truck off of said track, a detachable stop on said carriage against which said truck is adapted to impinge, a lock on said carriage for holding said truck against said stop, feed mechanism for moving said carriage on said guides, and actuating mechanism.

In testimony whereof I have signed my name to this specification in the presence of two subscribing witnesses.

CYRUS C. WEBSTER.

Witnesses:
H. L. HASEY,
GENEVIEVE HILL.